April 15, 1969  A. S. MAKAS  3,438,691

BIREFRINGENT POLARIZER

Filed May 14, 1964

INVENTOR.
ALBERT S. MAKAS
BY Brown and Mikulka
ATTORNEYS

United States Patent Office 3,438,691
Patented Apr. 15, 1969

3,438,691
BIREFRINGENT POLARIZER
Albert S. Makas, Medford, Mass., assignor to Polaroid Corporation, Cambridge, Mass., a corporation of Delaware
Continuation-in-part of application Ser. No. 290,715, June 26, 1963. This application May 14, 1964, Ser. No. 367,489
Int. Cl. G02f 1/24; G02b 5/30, 27/28
U.S. Cl. 350—157         13 Claims

ABSTRACT OF THE DISCLOSURE

A sheet-like polarizer comprising both isotropic and birefringent components, the index of refraction of the isotropic component lying between the ordinary and extraordinary indices of refraction of the birefringent components and said ordinary indices of refraction being symmetrically disposed relative to the axes of the extraordinary indices of refraction which axes are oriented substantially normal to a planar surface of said sheet-like polarizer.

---

This application is a continuation-in-part of application Ser. No. 290,715, now abandoned.

One object of the present invention is to provide an efficient birefringent-type light polarizer for use in area illumination.

Another object of the invention is to provide a birefringent-type light polarizer wherein a plurality of birefringent elements or components or particles are predeterminedly arranged in an isotropic matrix, the refractive index of which has a value between the ordinary and extraordinary refractive indices of the birefringent element and which value is closer to the extraordinary index thereof.

A further object is to provide a birefringent light polarizer in which the birefringent elements are arrayed in an axially-symmetric pattern.

Another object of the invention is to provide a birefringent-type light polarizer which, in conjunction with a remote light source, produces polarized light predominantly of one direction of vibration lying in a plane of incidence within a predetermined range of conic angles emanating from a point of a light source and which, outside of said range, produces diffused light.

A still further object of this invention is to provide a birefringent-type light polarizer of the character described adapted to produce polarized light of uniform polarizing direction at a wide variety of conic angles and throughout at least a given one of a plurality of concentric areas of an illuminated surface.

Other objects of the invention will in part be obvious and will in part appear hereinafter.

The invention accordingly comprises the device and system possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
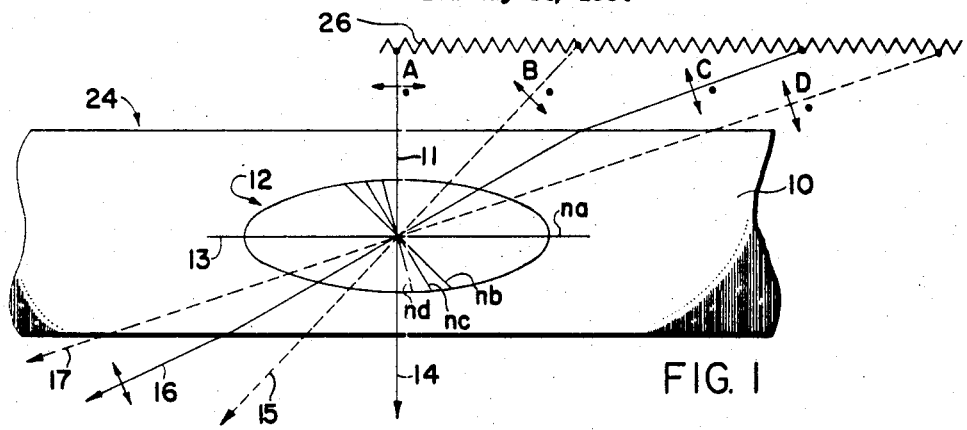
FIGURE 1 is a diagrammatic cross-sectional view showing the various paths of light from different points of a light source whose E vector lies in an incidence plane as it is refracted and transmitted by the novel light polarizer of the invention.

The light polarizer of the present invention is of a birefringent type and comprises birefringent elements arrayed optically in an axially symmetric orientation in an isotropic matrix component, the matrix component preferably having a refractive index close to the extraordinary index of refraction of the birefringent element.

The matrix may comprise any transparent isotropic material whose index of refraction ($n_m$) lies between the index of refraction of the unique or extraordinary axis ($n_e$) and the index of refraction of the ordinary axis ($n_o$) of the birefringent element. The selection of the particular material of the matrix is governed by a desired angle or angles of what may be termed a cone of transparency having its vertex at any point of a light source and its base at an area to be illuminated. The aforesaid angle, in turn, depends upon how losely $n_m$ approaches $n_e$. The matrix may comprise an enclosed liquid, glass or a polymer which is isotropic in cast form. Vinyl polymers such, for example, as polyvinyl butyrate are preferred but other isotropic materials fulfilling the optical requirements of the present invention may be employed. It should be noted that there is practically no limitation on the thickness of the matrix. It may be as thick or as thin as desired, provided it is capable of accommodating a layer or a plurality of embedded birefringent elements at least some of which may be in overlapping or overlying relation. The selected thickness is largely dependent upon the amount of light scattering in certain planes, the degree of polarizance, and the structural rigidity desired of the polarizer. The function of the matrix is primarily optical and not mechanical. The terms "cone of transparency" and "light scattering" will be described more fully below.

A birefringent element or elements suitable for use in the present invention is preferably or predominantly uniaxial and is placed in the matrix with its extraordinary axis normal to the plane of the matrix. In common with uniaxial elements generally, the birefringent element has two indices of refraction which, if it is strictly uniaxial are identical, or if it is predominantly uniaxial, are nearly equal in value, and a third refractive index which is termed extraordinary or unique and is widely different. For purposes of the present invention, in the interests of simplicity and clarity of language, birefringent elements or materials of the present device will be considered uniaxial, that is, having but two principal or functional indices of refraction, namely, an ordinary index and an extraordinary index. The extraordinary index of refraction ($n_e$) may be either higher or lower than the ordinary index of refraction, i.e., the element may be either a positive uniaxial element or a negative uniaxial element. For one particular minor function, the index of refraction of the matrix ($n_m$) might match the extraordinary index of refraction of the birefringent element. In general, however, the refractive index of the matrix is to be taken as lying between the two indices of the birefringent element and closer to the extraordinary index ($n_e$) thereof than to the ordinary index. Preferably, for facility of manufacture, the birefringent element may have a configuration or habit which is plate-like or sheet-like.

Suitable birefringent elements comprise uniaxial crystals or molecules such as "pearl-essence" materials, for example, guanine or guanidine-type compounds, or uniaxially disposed birefringent polymers such as Mylar (a trade name for polyester film sold by E. I. du Pont de Nemours & Co., Wilmington, Del. It should be understood that, in the case of polymers and some crystals, the elements may comprise a continuous phase or sheet rather than separate segments. For example, the polarizer of the invention may comprise a lamination of a polymeric birefringent element and an isotropic matrix.

As stated above, the birefringent element has an orientation in the matrix such that the extraordinary axis or axis of he extraordinary index of refraction of the element is normal to the plane of the matrix. This orientation may, for example, be acquired as a result of the configuration of the birefringent element and the "ordering" stresses exerted on the element during the casting or extrusion operation. If the birefringent element is in the form of a plurality of plate-like particles, they may thus be disposed in parallel overlapping relation in the plane of the matrix. It should be noted that no additional orientation step is necessary. This is another factor that permits the construction of a relatively thin polarizer since additional thickness, which in the manufacture of conventional sheet polarizers must ordinarily be present to provide for film stability after stretching, is not necessary in this instance. While the polarizer of the invention may be prepared by casting, extrusion, etc., it should be noted that the product thus formed has a non-birefringent aspect when viewed in a direction perpendicular to the plane of the matrix, that is, along an optic axis of the birefringent component.

Light polarizers within the scope of the invention are preferably utilized in the production of radially disposed polarized illumination having a vertical azimuth of vibration for areas or working surfaces at which people would normally be engaged in some enterprise such as reading or a specific visual task. In such areas it is highly desirable to eliminate specular glare, to facilitate improved perception of contrast and color saturation and to enhance visual acuity with respect to persons thus employed. The light polarizer of the invention provides an improved lighting system for accomplishing the above-stated objectives.

The present light polarizer is generally adapted to use with a light source which may be essentially a single source or one comprising a multiplicity of points and which may preferably have a light-reflecting surface such as a ceiling or a special reflector adjacent thereto. The subject polarizer is located generally between the light source and the area to be illuminated. The principal function of the polarizer of the invention is that it provides polarized light having its electric vector or E vector lying in a plurality of radially disposed planes of incidence. This results in the production of illuminated areas or zones which are substantially glare-free. Wherein the E vector may, undesirably, be perpendicular to an incidence plane, the ordinary index of refraction of the birefringent element ($n_o$) is a constant which is never the same as the index of refraction of the matrix ($n_m$). Therefore attenuation of any thus disposed E vector occurs by reflection and diffusion.

Light directed toward the light polarizer and vibrating in a plane of incidence is, respectively, converted by the polarizer into reflected light, transmitted polarized light, and diffused light depending upon the conditions set forth below. Incident light directed along the normal is attenuated by diffusion. This includes internal and forward scattering by the birefringent and matrix components as well as rearward-scattering, the terminology "scattering" and "diffusing" being used interchangeably as resultants of reflections. Light directed toward the light polarizer and vibrating at 90° to a plane of incidence is scattered as diffuse light. The intensity of the diffused light is a function of the difference between the ordinary indices of refraction of the birefringent element ($n_o$) and the index of refraction of the matrix ($n_m$). As the angle of incidence is varied between the major axis and the minor axis of the ellipse ($n_o$ and $n_e$, respectively, in the case of a negative uniaxial element), there is an angle between $n_e$ and $n_o$ which matches the angle of refraction of the matrix, i.e., where the index of refraction of the incident ray of light equals $n_m$. At this angle, the ray of light will pass through the polarizer without diffusion. When the index of refraction of the matrix and the index of refraction of the incident ray at a particular angle in the birefringent element are identical, a direction of maximum transparency for the polarized light is provided and, since there is little or no absorption involved, the intensity of the polarized light is also high.

Referring now to FIGURE 1, the index ellipsoid 12 of a uniaxial birefringent element with unique or extraordinary axis 11 and ordinary axis 13, is shown embedded in an isotropic matrix 10 thereby constituting the light polorizer 24. In the light polarizer illustrated, the extraordinary index of refraction ($n_e$) is to be understood as appreciably less than the ordinary index of refraction ($n_o$) and as slightly less than the index of refraction of the matrix ($n_m$). Rays A, B, C and D are rays of light from various points of a light source 26 in which the light whose E vector, indicated by the associated double-headed arrows, lies in a given plan of incidence, the O vector being shown by the associated dots. Each ray is caused to have an individual index of refraction in passing through the birefringent element. The index of refraction of the matrix is less than the indices of refraction of rays A and B, is equal to the index of refraction of ray C, and is greater than the index of refraction of ray D in the birefringent element. The indices of refraction of rays A, B, C and D are indicated by $n_a$, $n_b$, $n_c$ and $n_d$, respectively, and are shown to be at right angles to the trace of the ray paths as they pass through the index ellipsoid 12. Ray A, impinging on the polarizer in a direction substantially normal to the plane of the matrix, is diffused by reflection because of the mismatch of refractive index of the matrix with the ordinary index of the birefringent element, i.e., $n_m$ is less than $n_a$ which, in turn, is equal to $n_o$. Because it is non-essential to clarity of explanation, internal reflection and diffusion with the polarizer are not shown. Forward diffusion is indicated by line 14. Ray B, having an index of refraction $n_b$ is also diffused, as indicated at line 15, because $n_m$ is still less than $n_b$. Ray C is transmitted and polarized generally vertically, as indicated at line 16, without substantial loss of intensity because, at the angle at which ray C passes through the polarizer, $n_c$ equals $n_m$. Ray D is scattered, as indicated at line 17, because $n_m$ is greater than $n_d$ and there is again a mismatch of refractive indices of the birefringent element and the matrix. Rays of light having an E vector perpendicular to an incidence plane are not shown, because, as stated above, reflection and attenuation occur at any incident angle for vibrations perpendicular to an incidence plane. The E and O vectors are present at the scattered diffused ray portions 14, 15 and 17 to a greatly attenuated extent and are not shown.

Figure 2:
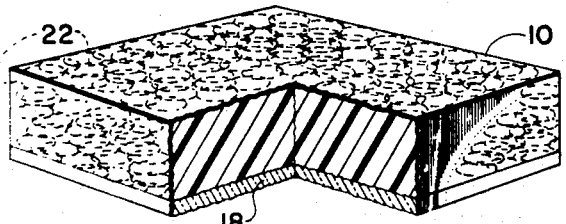
FIG. 2 is a fragmentary perspective view of one embodiment of the novel light polarizer of the invention.
Figure 3:
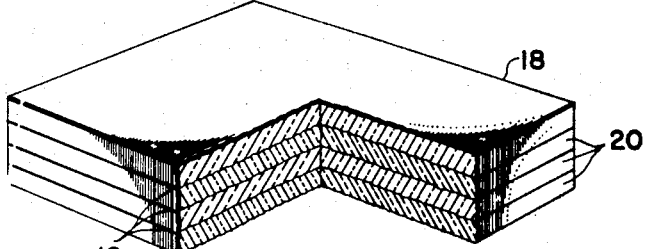
FIG. 3 is a fragmentary perspective view of another embodiment of the novel light polarizer of the invention.

In FIG. 2, there is shown an embodiment of the present invention inwhich plate-like uniaxial birefringent elements 22 are embedded in a matrix 10 which is mounted on a transparent support 18. FIG. 3 illustrates another embodiment in which a birefringent element in the form of continuous films or layers of a uniaxial polymer 19 are located between layers 20 of an isotropic matrix 20. In both examples, the forms may be considered as functionally similar and as laminations constituting unitary structures. The term "radially linearly polarized light" is intended to mean light which is linearly polarized in all planes of incidence about a given point and which is thus polarized in a direction normal to the plane of the polarizer. The azimuth of vibration of the linearly polarized light is thus always so disposed as to be transmitted to working surfaces below the polarizer in a multiplicity of radially disposed planes of incidence, that is, as substantially vertically disposed vibrations, regardless of the direction of the ray.

With reference to other known light polarizing devices intended for area illumination, that disclosed in U.S. Patent No. 3,069,974, is an axis-variant type of diffuse polarizer. No linear birefringence exists in the plane of the film or in the matrix. The polarizer of the aforesaid patent employs a plurality of isotropic flakes in an isotropic medium, the plate-like flakes being arrayed parallel to the film's surface. Wherein other diffuse-type linear polarizers have been described, the polarizer of the present invention markedly differs therefrom in that such diffuse-type linear polarizers provide a linear birefringent aspect when viewed in a direction normal thereto. This is because the index of refraction of the matrix matches precisely either of the two indices of refraction of the birefringent element. In such diffuse-type linear polarizers, it is critical that a mismatch of the index of refraction of the matrix with one of the two indices of refraction of the element be avoided. In contradistinction to the above-described prior-art polarizers and as previously set forth, the polarizer of the present invention comprises birefrigent elements arrayed optically in an axially symmetric orientation, that is, about the plurality of extraordinary axes 11 existing throughout the polarizer, not in a linear birefringent configuration. Furthermore, as stated, the birefringent elements are carried in an isotropic medium, the refractive index of which is close to the extraordinary index of the birefringent element; i.e., lying somewhere between the ordinary index of refraction and the extraordinary index of refraction, but closer to the extraordinary index of refraction.

The polarizer of the present invention may be as thick or as thin as desired, since the polarization effects, except in degree, are not dependent upon the thickness. The cone of transparency, that is, the angular range within which light is transmitted in a linearly polarized state, is determined by the relative indices of refraction of the birefringent element and the matrix. These indices may be preselected or varied as desired. The conic angles are increased with respect to the vertical as the refractive index of the matrix approaches the extraordinary index of the birefringent element.

Figure 4:
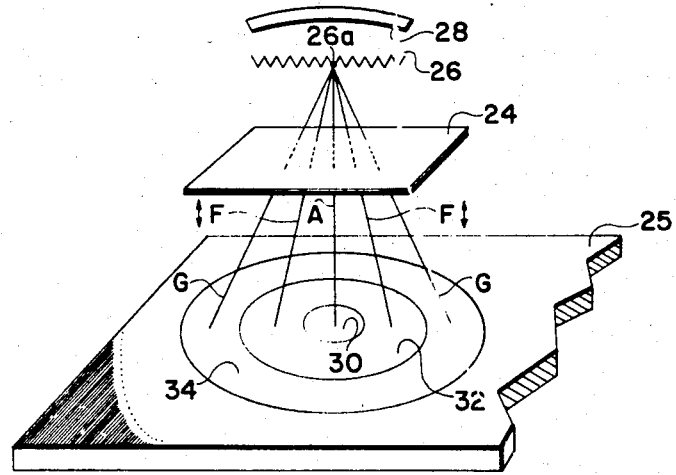
FIG. 4 is a diagrammatic perspective view of the selective illumination of an area by a given point of an overhead light source in conjunction with the light polarizer of the invention.

FIG. 4 illustrates, diagrammatically, the selective illumination of an area or surface 25, by one point 26a of an overhead light source 26 having a reflector 28, in conjunction with the light polarizer 24 of the invention. The central zone 30, generally underlying the point light source 26a and illuminated by the central rays A (one only shown) is provided with diffused light. The band-like zone 32 is that illuminated by rays F and represents polarized light of high intensity, having the vibration direction represented by the associated double-headed arrows. The polarized light within the zone 32 is essentially glare-free. Zone 34, illuminated by rays G, represents a second area of predominantly diffused light. Although but a single ray is shown as illuminating the central zone 30 and but two rays as illuminating each zone 32 and 34, it is to be understood that a multiplicity of the rays A, F and G actually exist, lying in radially disposed planes of incidence about a central axis, so that conical bundles of rays produce the illumination of the zones. Radially outwardly from zone 34 the light is to be understood as alternately diffused and polarized in concentric bands. A weakly polarized zone lying far out in a radial direction would be produced if the conic ray angles were grazing or nearly parallel to the plane of the light polarizer. This condition would occur if the refractive index of the matrix were to exactly match that of the extraordinary index of the birefringent element and is merely mentioned as a possibility with only a relatively small functional value. The linearity of polarization and intensity of illumination within any zone such as the zone 32 are, in general, at peak value radially midway of the zone.

The angle of the cones to be provided is determined by the careful selection of $n_m$ with respect to the indices of the birefringent element. It is thus determined in terms of its function relative to a given work surface. For example, assuming a drafting board application where the work plane is tilted relative to the horizontal, it is essential that the cone angle be made smaller to provide for glare elimination. For a horizontal work plane, a different cone angle may be employed. Glare elimination is generally encountered when light rays are incident upon a surface at an angle of approximately 57° to the vertical. Merely by way of example, wherein the polarizer of the invention includes a positive uniaxial birefringent element, the refractive index of the isotropic element could be approximately three-fifths that of the extraordinary refractive index of the birefringent element. By employing an isotropic matrix having a refractive index which is four-fifths that of the aforesaid extraordinary refractive index, the zone of functionally polarized light of FIG. 4 would be caused to move radially outwardly and supplanted by a zone of diffused light.

It is to be understood that wherein a plurality of light sources or a continuous type of light source is employed, a myriad of points of light is thus provided. A plurality of properly spaced polarizers of the invention or a single such polarizer in the form of a continuous sheet, employed therewith, would have the capacity of producing overlapping areas of polarized illumination such that the areas or zones shown in FIG. 4 as those of diffused light would be rendered areas of functionally polarized illumination also.

Wherein a light source has been specified herein, substantially any type thereof, including incandescent and fluorescent means, may be employed in a system of the present invention, depending upon general illumination considerations. Again, reflecting means, associated with the light source may be chosen primarily with respect to conventional illumination practices, either specularly- or diffusely-reflecting surfaces, metallic or non-metallic, being functionally suitable.

With reference to the distribution of birefringent platelets or particles in an isotropic carrier or matrix, a plurality of such elements in overlapping relation is essential to achieve an intended linearity of polarization and transmittance of rays as well as an attenuation of an unwanted vibration direction which is perpendicular to a plane of incidence, that is, the E vector of the unpolarized light, shown as dots in FIGURE 1. It is to be understood that the birefringent particles are so present throughout the matrix as to provide a uniform normal disposition of the extraordinary axis to the plane of the carrying layer and a generally homogeneous structure.

What is claimed is:

1. A sheet-like polarizer comprising a plurality of uniaxial briefringent components having ordinary and extraordinary indices of refraction;

an isotopic matrix component having a refractive index lying between said indices of refraction of said birefringent components, said plurality of birefringent components being positioned in said isotropic matrix component such as to provide a symmetrical orientation of said ordinary indices of refraction of said birefringent components about any of a plurality of axes which are substantially normal to a planar surface of said sheet-like polarizer, each of said plurality of axes being representative of the axes of the extraordinary indices of refraction of said birefringent components.

2. A light polarizer, as defined in claim 1, wherein the refractive index of said matrix component is closer to the extraordinary than to the ordinary index of refraction of said birefringent components.

3. A light polarizer, as defined in claim 1, wherein the ordinary index of refraction of said birefringent component is less than the index of refraction of the matrix component.

4. A light polarizer, s defined in claim 1, wherein the ordinary index of refraction of said birefringent component is greater than the index of refraction of the matix component.

5. A light polarizer, as defined in claim 1, wherein said birefringent component is a positive uniaxial component.

6. A light polarizer, as defined in claim 1, wherein said birefringent component is a negative uniaxial component.

7. A light polarizer comprising a sheet-like lamination of a continuous uniaxial birefringent element and a supporting layer of an isotropic material, the extraordinary axis of said birefringent element being disposed in a direction normal to the plane of said lamination, the index of refracttion of said isotropic material being intermediate of the extraordinary and ordinary indices of refraction of said birefringent element, said ordinary indices of refraction being symmetrically disposed relative to said extraordinary axis.

8. A light polarizer, as defined in claim 7, wherein said birefringent element is a polymeric film.

9. A system for converting randomly vibrating light into radially disposed linearly polarized light, comprising, in combination, a light source, means providing a light-reflecting surface for downwardly reflecting light from said source, and a light polarizing element located between said light source and a surface to be illuminated, said light polarizing element comprising birefringent means optically arrayed in an axially symmetric orientation in an isotropic matrix, said birefringent means comprising a uniaxial material having two indices of refraction which are substantially equal, and an extraordinary index of refraction differing markedly from each of said indices and to a lesser degree from the index of refraction of said matrix, the axis of said extraordinary index of refraction being substantially normal to a planar surface of said polarizing element.

10. A system, as defined in claim 9, wherein are included a plurality of said light sources and a plurality of said polarizing elements for illuminating a large area and providing linearly polarized light of a given azimuth throughout said area.

11. A system, as defined in claim 9, wherein functional extraordinary vibration components of said light lie in a plurality of radially disposed planes of incidence relative to said surface.

12. A system, as defined in claim 11, wherein light from said source is transmitted by said light polarizer in a plurality of functional angular directions.

13. A system, as defined in claim 12, wherein said light provides at said illuminated surface a central zone of diffused light and a circular band ond polarized light thereabout having a polarizing direction normal to said surface.

References Cited

UNITED STATES PATENTS

| | | | |
|---|---|---|---|
| 2,123,901 | 7/1938 | Land | 350—157 |
| 2,346,247 | 4/1944 | Bailey et al. | 240—9.5 |
| 3,069,974 | 12/1962 | Marks et al. | 350—152 |
| 3,205,775 | 9/1965 | Marks | 350—147 X |
| 3,213,753 | 10/1965 | Rogers | 350—157 |

DAVID SCHONBERG, *Primary Examiner.*

PAUL R. MILLER, *Assistant Examiner.*

U.S. Cl. X.R.

350—147, 152, 156; 240—9.5

U.S. DEPARTMENT OF COMMERCE

PATENT OFFICE

Washington, D.C. 20231

UNITED STATES PATENT OFFICE
CERTIFICATE OF CORRECTION

Patent No. 3,438,691                                                                      April 15, 196

Albert S. Makas

It is certified that error appears in the above identified patent and that said Letters Patent are hereby corrected as shown below:

Column 2, line 23, "losely" should read -- closely --. Column 3, line 7 "he" should read -- the --. Column 4, line 37, "with" should read -- within Column 6, line 49, "briefringent" should read -- birefringent --; line 72, "s" should read -- as --; line 74, "matix" should read -- matrix --. Column 8, line 15, "ond" should read -- of --.

Signed and sealed this 14th day of April 1970.

(SEAL)
Attest:

Edward M. Fletcher, Jr.                                  WILLIAM E. SCHUYLER, JR.
Attesting Officer                                                   Commissioner of Patents